United States Patent
Wang et al.

[11] Patent Number: 6,153,687
[45] Date of Patent: Nov. 28, 2000

[54] HONEYCOMB DIP RESIN

[75] Inventors: Yen-Seine Wang, San Ramon; Mark S. Caldwell, Castro Valley, both of Calif.

[73] Assignee: Hexcel Corporation, Pleasanton, Calif.

[21] Appl. No.: 09/300,110

[22] Filed: Apr. 27, 1999

[51] Int. Cl.[7] ...................... C09D 161/06; C09D 177/00
[52] U.S. Cl. .......................... 524/538; 524/323; 524/391; 525/429
[58] Field of Search ............................. 525/429; 524/538, 524/323, 391

[56] References Cited

U.S. PATENT DOCUMENTS

| | | | |
|---|---|---|---|
| 3,673,058 | 6/1972 | Jackson et al. | 161/68 |
| 4,845,162 | 7/1989 | Schmitt | 525/423 |
| 4,957,577 | 9/1990 | Huebner | 156/197 |
| 5,139,596 | 8/1992 | Fell | 156/205 |
| 5,217,556 | 6/1993 | Fell | 156/205 |
| 5,260,117 | 11/1993 | Myers et al. | 428/196 |
| 5,288,537 | 2/1994 | Corden | 428/116 |
| 5,498,462 | 3/1996 | Darfler | 428/116 |
| 5,685,936 | 11/1997 | Komine et al. | 156/182 |

*Primary Examiner*—Patricia A. Short
*Attorney, Agent, or Firm*—W. Mark Bielawski; David J. Oldenkamp

[57] ABSTRACT

A solution of phenolic and polyamide polymers is used as a dipping resin to coat composite honeycomb structures. The phenolic/polyamide dipping resin increases the heat formability and strength of composite honeycomb structures. The coating formed by the resin includes from 30 to 95 weight percent phenolic resin and 5 to 30 weight percent polyamide resin.

7 Claims, No Drawings

HONEYCOMB DIP RESIN

BACKGROUND OF THE INVENTION

1. Field of the Invention

The present invention relates generally to dip resins which are used to coat non-metallic honeycomb structures to improve the structural strength of the honeycomb. More particularly, the present invention is directed to dip resins which are used to coat non-metallic honeycomb which is designed to be heat formed (thermoformed) into a variety of different non-planar shapes.

2. Description of Related Art

Honeycomb structures are well known and widely used in many applications where a high strength and lightweight material is required. The combined features of lightweight and strength found in honeycomb structures makes them particularly well-suited for use in aircraft and other applications where high strength and low weight are required. Honeycomb structures have been made from a wide variety of materials including metals, such as aluminum. Composite materials made from resin impregnated fibers and papers have also been widely used in honeycomb structures. Thermosetting resins have typically been used as the resin matrix of choice in cases where the honeycomb is used as part of a structural member where optimum honeycomb strength is required.

One common process for fabricating honeycomb structures involves bonding multiple sheets of material together along specially oriented node lines. The node lines are offset between different layers in such a way that a honeycomb structure is formed when the layers are expanded. This type of process is commonly referred to as "expansion" process. The expansion process is not suitable for fabricating honeycomb structures in some instances where certain thermoset matrix resins are used. For example, sheets made from certain materials which are too stiff or porous cannot be formed into honeycomb structures using the expansion process.

A fabrication process or method commonly referred to as the "corrugation" process has been used to form high strength thermoset honeycomb structures in those situations where the expansion process cannot be used. The corrugation process involves initially shaping sheets of uncured thermoset or thermoplastic material into a corrugated configuration. The corrugated sheets are cured at high temperature to form stiff corrugated sheets which are then bonded together to form the honeycomb core. The honeycomb core is then coated with a dip resin. The honeycomb core is generally cut into numerous flat panels which can be used "as is" or further processed in accordance with conventional honeycomb fabrication techniques. For example, the honeycomb core may be sandwiched between sheets of various materials to form extremely strong structural panels.

In many instances, it is desirable to take the honeycomb core and shape it into non-planar structural elements. This is accomplished by heating the honeycomb until it becomes sufficiently soft to allow it to be molded or otherwise shaped into the desired configuration. A number of problems have been experienced during the heat forming of thermoset panels into non-planar shapes. For example, the final structural strength of thermoset honeycomb cores can be adversely affected by the high temperatures required to soften the cured resin. In addition, many of the high strength adhesives that are used to bond the panels together become weak at temperatures below those required to soften the thermoset material. As a result, the cores become uncontrollably distorted and weakened during the heat forming process. This problem is especially acute for heavy density and/or small cell honeycomb cores.

In view of the above, there is a need to provide honeycomb cores which are sufficiently strong to be useful as structural panels and which can be heat molded into non-planar shapes without unduly distorting or otherwise adversely affecting the honeycomb structure or strength.

SUMMARY OF THE INVENTION

In accordance with the present invention, it was discovered that the heat formability of honeycomb is improved by coating the honeycomb core with a dip resin which is composed of phenolic and polyamide resins. It was discovered that use of the combined phenolic/polyamide dip resin not only increases the heat formability of the honeycomb core, but also increases the overall strength of the honeycomb.

The dip resins of the present invention include combinations of phenolic resin and polyamide resin which are dissolved in a suitable solvent to provide a resin solution which is suitable for application to the surface of honeycomb. The dip resin, when cured, forms a modified phenolic resin coating which is composed of 10 to 95 weight percent phenolic resin and 5 to 90 weight percent polyamide resin. The dip resin may be used to coat a wide variety of honeycomb to improve heat formability and strength.

The dip resins are applied to the honeycomb in accordance with known dipping procedures and may be advantageously used as a replacement for dip resins in other honeycomb fabrication processes where a dip resin is needed or desirable. The dip resins are well-suited for use in improving the formability of heavy density honeycomb core which include interleaf layers (bisector sheets).

The above-discussed and many other features and attendant advantages of the present invention will become better understood by reference to the following detailed description.

DETAILED DESCRIPTION OF THE INVENTION

The dip resins of the present invention are well-suited for use in coating honeycombs which may be formed into a wide variety of high strength non-planar structures. Such structures include, for example, aircraft engine nacelles, high performance automobile and boat bodies and other applications where high strength and lightweight contoured structures are necessary.

The dip resin is a combination of phenolic and polyamide resins which are both incorporated into a sufficient amount of a suitable diluent or solvent to provide a solids solution which can be applied to the honeycomb in the same manner as known dip resins. Although any number of different phenolic resins may be used for the phenolic portion of the dip resin, flexible phenolic resins are preferred. Flexible phenolics have a relatively low cross-link density when compared to non-flexible phenolics.

Low cross-linking of the phenolic is achieved by increasing the chain length or adding suitable modifiers such as biphenol A or other resins which can be co-cured with phenolics. Alternatively, the curing conditions can be chosen so as to keep cross-linking of the phenolic resin to a minimum. Procedures for producing flexible phenolics are well-known. Exemplary flexible phenolics which may be used in the dip resin are made by Georgia Pacific (Decatur, Ga.) and identified as GP493T24 and GP493T24M phenolic resin. Phenolic resins made by OxyChem Corp. (Grand Island, N.Y.) and identified as 43243 and 23–057 phenolic resins are also suitable. Also, GP652D60 and SC913B (Borden) are suitable.

The polyamides used in the dipping resin should have relatively high elongation at break at room temperature and relatively high impact strength. Exemplary polyamides include GRILAMID® TR55 which is available from EMS-Chemie AG (Zurich, Switzerland) and ELVAMIDE® 8061 which is available from DuPont (Wilmington, Del.). GRILAMID® TR55 is a polyamide based on nylon 12 which has an elongation at break (ASTM 638) of 120 percent for dry-as-molded material and 220 percent for conditioned material. ELVAMIDE® 8061 is a nylon multi-polymer resin which has an elongation at break (ASTM 0638) of 300 percent. The Izod impact strength for GRILAMID® TR55 (ASTM 256) is 59 Joule/meter for dry-as-molded material and 112 Joule/meter for conditioned material. Other properties of GRILAMID® TR55 and ELVAMIDE® 8061 are set forth in product brochures which are available from the manufacturers.

The dip resin is made by combining solutions of phenolic and polyamide resins. Phenolic resins are typically supplied as a solution which includes from 50 to 60 weight percent phenolic resin dissolved in a suitable solvent such as isopropyl alcohol. A small amount of water is also usually present in the solution. Polyamide resins are usually supplied as dry pellets. It is preferred that the polyamide pellets be dissolved in a suitable solvent, such as benzyl alcohol, to provide a solids solution having from 5 to 25 weight percent polyamide resin. Polyamide resin solutions containing about 10 weight percent resin are preferred.

The phenolic and polyamide resins are combined in amounts which produce a dip resin that includes from 10 to 45 weight percent total resin and 90 to 55 weight percent solvent. The amount of phenolic and polyamide resin present in the dip resin may be varied depending upon a number of different parameters including the viscosity required for different application techniques, desired coating thickness and number of coating layers desired. Dip resins which include from 20 to 30 weight percent resin solids are preferred. The viscosity of the dip resin solution should be on the order of 200 to 800 centipoise (cps).

The resin portion of the dip resin or dip solution includes from 10 to 95 weight percent phenolic resin and from 5 to 90 weight percent polyamide resin. Preferred weight percentages are from 55 to 80 weight percent phenolic resin and 20 to 45 weight percent polyamide resin. More preferred weight percentages are from 65 to 75 weight percent phenolic resin and from 25 to 35 weight percent polyamide resin. When cured, the dip resin forms a coating which is a modified phenolic having the same percentage of phenolic and polyamide resins which is present in the resin portion of the dip resin. The solvents used in the dip resin include any of the common solvents used in connection with phenolic and/or polyamide resins. Benzyl alcohol, isopropyl alcohol and combinations thereof are preferred.

An exemplary procedure for making a dip resin in accordance with the present invention is as follows:

A 10 weight percent solution of GRILAMIDE® R TR55 (Solution A) is prepared by dissolving GRILAMIDE® TR55 pellets in benzyl alcohol. Solution A is mixed with Solution B (GP493T24–55 weight percent phenolic resin in isopropyl alcohol) to form a dip resin solution which includes 70 weight percent Solution A and 30 weight percent Solution B. The resulting dip resin has about 24 weight percent resin which is dissolved in about 76 weight percent of a solvent composed of benzyl and isopropyl alcohol. The resin portion of the dip resin contains about 30 weight percent polyamide and about 70 weight percent phenolic resin. The concentration of resin in Solutions A and B may be varied provided that the solutions are combined in sufficient relative amounts to produce a dip resin solution wherein the total amount of resin constitutes from 10 to 45 weight percent of the solution and the relative amounts of phenolic resin and polyamide resin in the resin portion of the solution fall within weight percent limits set forth above. If desired, a relatively concentrated dip resin may be prepared. The concentrated dip resin is then further diluted with isopropyl and/or benzyl alcohol to form the final working dip resin.

Another dip resin was prepared in the same manner as the preceding example except that the amounts of solutions A and B were varied to provide a dip solution where the resin portion contained about 21 weight percent polyamide and about 79 weight percent phenolic resin. A further exemplary dip solution was prepared in the same manner except that the resin portion contained about 35 weight percent polyamide and about 65 weight percent phenolic resin. Both of the above dip resins performed satisfactorily as dip resins.

The phenolic/polyamide dipping resin is applied to the honeycomb in the same manner as conventional dipping resins. The honeycomb may be submerged in the dipping resin or the dipping resin may be applied by flow coating. The number of coats of dipping resin and the overall resin thickness may be varied to achieve desired levels of increased strength and thermal formability for a particular honeycomb.

The dip resin may be used to coat a wide variety of honeycomb types and configurations. The dip resin is especially useful for coating heavy density honeycomb, i.e., honeycomb which includes bisector sheets. The dip resin is preferably used to increase the thermoformability and strength of honeycomb structures which are designed to be thermoformed. The preferred honeycombs are those which utilize glass or carbon fibers in combination with a thermoformable matrix resin. Flexible phenolic and modified phenolics are examples of suitable matrix resins. Although the dip resin may be used with honeycombs having a wide variety of fiber configurations, honeycombs which incorporate resin impregnated woven fabric are preferred. The dip resin may be used to coat honeycombs made with unidirectional fabric or randomly oriented fibers, if desired.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. A dip resin comprising:

10 to 45 weight percent resin, said resin comprising 10 to 95 weight percent phenolic resin and 5 to 90 weight percent polyamide resin; and 90 to 55 weight percent of a solvent for said resin.

2. A dip resin according to claim 1 which wherein said resin comprises 55 to 80 weight percent phenolic resin and 20 to 45 weight percent polyamide resin.

3. A dip resin according to claim 2 which wherein said resin comprises 65 to 75 weight percent phenolic resin and 25 to 35 weight percent polyamide resin.

4. A dip resin according to claim 1 wherein said phenolic resin is a flexible phenolic.

5. A dip resin according to claim 2 wherein said phenolic resin is a flexible phenolic.

6. A dip resin according to claim 3 wherein said phenolic resin is a flexible phenolic.

7. A dip resin according to claim 1 wherein said solvent comprises benzyl alcohol and isopropyl alcohol.

* * * * *